(12) United States Patent
Zhou

(10) Patent No.: US 11,746,512 B2
(45) Date of Patent: Sep. 5, 2023

(54) FLOW CONTROLLER AND BUBBLER

(71) Applicants: Xiamen Water Nymph Sanitary Technology Co., Ltd., Xiamen (CN); Huaqiang Zhou, Xiamen (CN)

(72) Inventor: Huaqiang Zhou, Xiamen (CN)

(73) Assignees: Xiamen Water Nymph Sanitary Technology Co., Ltd., Xiamen (CN); Huaqiang Zhou, Xiamen (CN)

( * ) Notice: Subject to any disclaimer, the term of this patent is extended or adjusted under 35 U.S.C. 154(b) by 452 days.

(21) Appl. No.: 17/113,399

(22) Filed: Dec. 7, 2020

(65) Prior Publication Data
US 2021/0172158 A1    Jun. 10, 2021

(30) Foreign Application Priority Data

Dec. 10, 2019 (CN) .......................... 201911257633.X

(51) Int. Cl.
*E03C 1/08* (2006.01)
*F15D 1/02* (2006.01)

(52) U.S. Cl.
CPC . *E03C 1/08* (2013.01); *F15D 1/02* (2013.01)

(58) Field of Classification Search
CPC .......... F16K 17/30; F16K 17/34; F16K 17/28; F16K 15/148; F15D 1/02; G05D 7/0113; G05D 7/012; E03C 1/08; E03C 1/084; B05B 1/30
USPC ....................... 138/43, 45, 46; 137/488, 501; 239/428.5, 419.5
See application file for complete search history.

(56) References Cited

U.S. PATENT DOCUMENTS

| | | | | |
|---|---|---|---|---|
| 3,085,591 A | * | 4/1963 | Schneider | F16K 15/148 137/859 |
| 4,986,310 A | * | 1/1991 | Bailey | F16K 15/148 137/859 |
| 6,216,741 B1 | * | 4/2001 | Aarntzen | F16K 17/34 138/46 |
| 2008/0265064 A1 | * | 10/2008 | Keren | F16K 15/141 239/533.1 |
| 2013/0168579 A1 | * | 7/2013 | Lin | F16K 17/28 251/12 |
| 2013/0199626 A1 | * | 8/2013 | Teng | F16K 15/141 137/119.01 |
| 2017/0198826 A1 | * | 7/2017 | Chen | F16K 17/168 |
| 2018/0353979 A1 | * | 12/2018 | Kiefer | B05B 1/185 |
| 2022/0382301 A1 | * | 12/2022 | Jensen | G06F 30/28 |

* cited by examiner

*Primary Examiner* — Patrick F Brinson
(74) *Attorney, Agent, or Firm* — Westbridge IP LLC

(57) ABSTRACT

The invention discloses a flow controller and a bubbler. The flow controller comprises a shell and a sheet part, wherein a water outlet is formed in the bottom of the shell, the top of the shell is open, a water space is formed between the sheet part and the bottom of the shell, the sheet part covers the water outlet, elastic legs are disposed on the sheet part and include at least two support legs and at least one suspension leg, and the sheet part is supported at the bottom of the shell through the support legs, and the suspension leg is spaced apart from the bottom of the shell. The sheet part provided with the elastic legs is used to resist the water pressure, the water pressure-bearing capacity of the sheet part is improved, and the service life of the sheet part is guaranteed.

12 Claims, 4 Drawing Sheets

FLOW CONTROLLER AND BUBBLER

CROSS-REFERENCE TO RELATED APPLICATIONS

The application claims priority to Chinese patent application CN 201911257633.X, filed on Dec. 10, 2019, the entire contents of which are incorporated herein by reference.

TECHNICAL FIELD

The invention relates to the technical field of water saving of bath products, in particular to a flow controller and a bubbler.

BACKGROUND

Flow control devices are typically arranged in bath water outlet products such as faucets, showers or bubblers on the present market to control the outlet flow not to change along with the increase of water pressure when the inlet water pressure reaches a certain degree, so as to keep the outlet flow basically constant. In this way, the water outlet products can obtain the same flow under different water pressure conditions and can realize a stable water outlet effect, water is saved, and the comfort is guaranteed.

Chinese Utility Model Patent Application No. 201120571183.4 discloses a flow controller which is designed in such a manner that an elastic body provided with clamping jaws is disposed in a shell and is supported by the clamping jaws to maintain a gap between the elastic body and the shell to keep the water pressure stable. However, when the water pressure exceeds a pressure limit that can be borne by the clamping jaws, the clamping jaws will break, and the flow controller will be damaged.

SUMMARY

The technical issue to be settled by the invention is to provide a flow controller that can bear a high water pressure, and a bubbler.

To settle the aforesaid technical issue, the technical solution adopted by the invention is as follows: a flow controller comprises a shell and a sheet part, wherein a water outlet is formed in the bottom of the shell, the top of the shell is open, the sheet part is located in the shell, a water space is formed between the sheet part and the bottom of the shell, the sheet part covers the water outlet, elastic legs are disposed on the sheet part and include at least two support legs and at least one suspension leg, the sheet part is supported at the bottom of the shell through the support legs, and the suspension leg is spaced apart from the bottom of the shell.

The invention has the following beneficial effects: the sheet part provided with elastic legs is used to resist the water pressure, the support legs, supported at the bottom of the shell, on the sheet part serve as a first stage of support part, and the suspension leg on the sheet part serves as a second stage of support part; when the sheet part bears a high water pressure, the distance between the sheet part and the bottom of the shell will decrease, the suspension leg contacts with the bottom of the shell, and the second stage of support part starts to share the pressure borne by the first stage of support part, so that the water pressure-bearing capacity of the sheet part is improved, the legs on the sheet part will not be fractured under pressure, and the service life of the flow controller is prolonged.

DETAILED DESCRIPTION OF THE EMBODIMENTS

Figure 1:
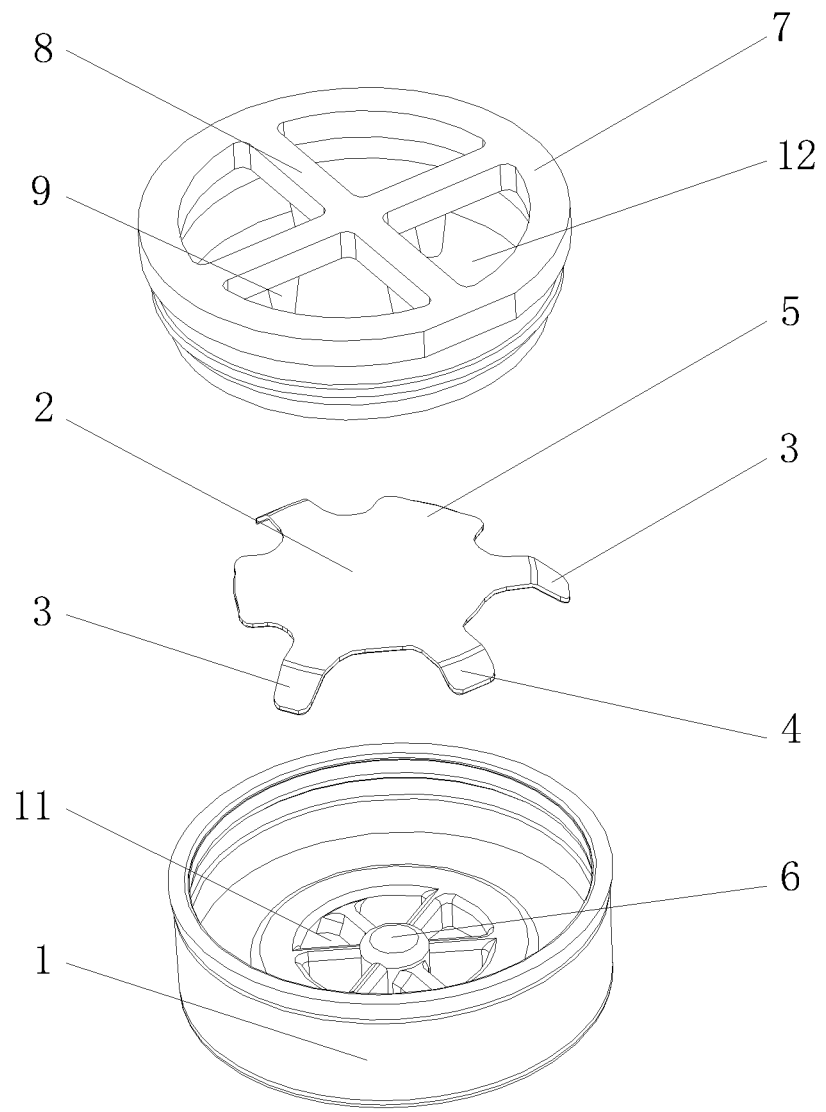
FIG. 1 is an exploded view of the overall structure of a flow controller in Embodiment 1 of the invention.

The technical contents, purposes and effects of the invention will be described in detail below in conjunction with the embodiments and accompanying drawings.

The key conception of the invention lies in that legs are used as multiple stages of support parts to support a sheet part stage by stage.

Referring to FIG. 1 to FIG. 5, the invention provides a flow controller which comprises a shell and a sheet part, wherein a water outlet is formed in the bottom of the shell, the top of the shell is open, the sheet part is located in the shell, a water space is formed between the sheet part and the bottom of the shell, the sheet part covers the water outlet, elastic legs are disposed on the sheet part and include at least two support legs and at least one suspension leg, the sheet part is supported at the bottom of the shell through the support legs, and the suspension leg is spaced apart from the bottom of the shell.

The operating principle of the invention is as follows: the top of the shell serves as a water inlet end, and the water outlet in the bottom of the shell serves as a water outlet end; in case of no water pressure, the support legs, in contact with the bottom of the shell, on the sheet part serve as a first stage of support part, and the suspension leg serves as a second stage of support part; in the water inflow process, water from the water inlet end impacts the sheet part to flow to the water outlet end along the space between the sheet part and the shell; with the increase of the water pressure, the distance between the sheet part and the bottom of the shell decreases under pressure, and the second stage of support part contacts with the bottom of the shell with the descending of the sheet part so as to share the pressure borne by the first stage of support part.

From the above description, the invention has the following beneficial effects: the sheet part provided with the elastic legs is used to resist the water pressure, the support legs, supported at the bottom of the shell, on the sheet part serve as the first stage of support part, and the suspension leg on the sheet part serves as the second stage of support part; when the sheet part bears a high water pressure, the distance between the sheet part and the bottom of the shell will decrease, the suspension leg contacts with the bottom of the shell, and at this moment, the second stage of support part starts to share the pressure borne by the first stage of support part; in this way, the water pressure-bearing capacity of the sheet part is improved, fractures of the legs on the sheet part under pressure are avoided, and the service life of the flow controller is prolonged.

Furthermore, at least one pillar is disposed between the bottom of the shell and the sheet part and is located at the bottom of the shell, and the distance between the sheet part and the pillar is greater than the distance between the suspension leg and the bottom of the shell.

From the above description, if the sheet part continues to decrease under the water pressure after all the legs contact with the bottom of the shell, the pillar serves as the last stage of support part to support the sheet part and thus can prevent the sheet part from sealing the water outlet in the bottom of the shell.

Furthermore, a partition rib for partitioning the water outlet is disposed at the water outlet, and the pillar is disposed on the partition rib.

From the above description, the pillar is disposed on the partition rib to ensure that the support position of the pillar is close to the center of the sheet part, so that the situation where the sheet part deviates when supported by the pillar, and consequentially, the flow control effect is affected is avoided.

Furthermore, the number of the suspension legs is at least two, and the distances between the at least two suspension legs and the bottom of the shell are different.

From the above description, multiple suspension legs are disposed on the sheet part and are suspended at different heights to serve as multiple stages of support parts for supporting the sheet part when the sheet part is impacted by the water pressure, and the legs on the sheet part share the pressure stage by stage, so that fractures of the legs under an excessive pressure are avoided.

Furthermore, the flow controller further comprises a top cover, wherein a water hole is formed in the top cover, and the top cover is connected to the top of the shell.

From the above description, the sheet part is disposed between the top cover and the shell to be prevented from being separated from the shell under an elastic effect when impacted by the water pressure.

Furthermore, a limiting rib for partitioning the water hole is disposed at the water hole of the top cover, a limiting pillar is disposed on the limiting rib and is located between the sheet part and the top cover, and a gap is reserved between the limiting pillar and the sheet part.

From the above description, the limiting rib is disposed on the top cover to partition the water hole, and the limiting pillar is disposed on the limiting rib to limit the position of the sheet part, so that the situation where the legs are erected on the inner wall of the shell or deviate when the sheet part is impacted by the water pressure is avoided.

Furthermore, the top cover is conical, the water hole is formed in the top of the top cover, and at least one auxiliary water hole is formed in a conical surface of the conical top cover and is smaller than the water hole in size.

From the above description, the water hole is aligned with the center of the sheet part, and the auxiliary water hole in the conical surface faces the sheet part, so that it is ensured that water directly flows to the sheet part at a high rate via the water hole and flows to the sheet part via the auxiliary water hole in the conical surface.

Furthermore, at least one extension part is disposed on the sheet part.

From the above description, the extension part can enlarge the water pressure-bearing area of the sheet part, thus expanding the action range of the sheet part and improving the stability of the outlet flow.

Furthermore, a bubbler comprises the flow controller.

From the above description, the flow controller is mounted in the bubbler to control the flow in the in the bubbler.

Figure 2:
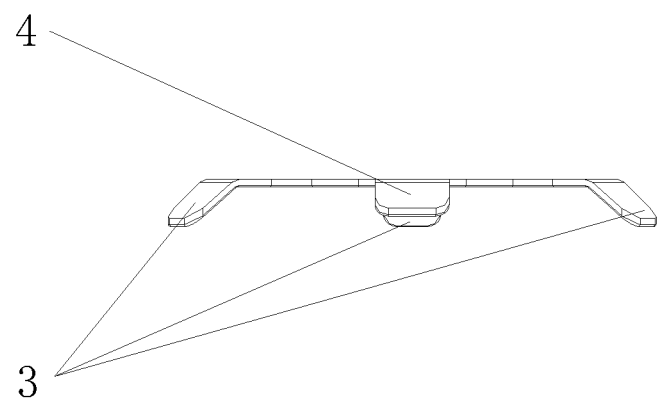
FIG. 2 is a sectional view of a sheet part in FIG. 1.
Figure 3:
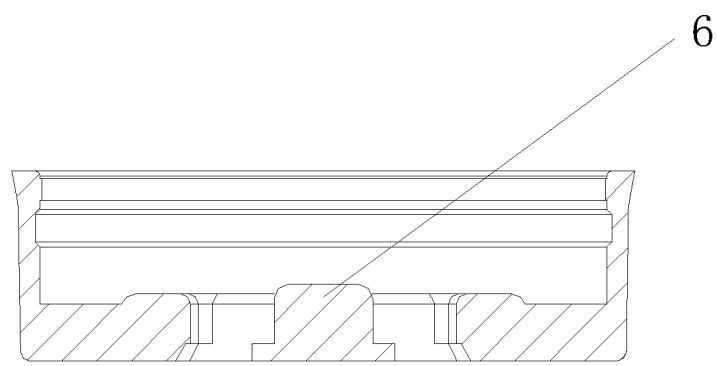
FIG. 3 is a vertical sectional view of a shell in FIG. 1.

Referring to FIG. 1 to FIG. 3, Embodiment 1 of the invention is as follows:

The invention provides a flow controller which comprise a shell 1 and a sheet part 2, wherein a water outlet 11 is formed in the bottom of the shell 1, and the top of the shell 1 is open.

The sheet part 2 is located in the shell 1, a water space is formed between the sheet part 2 and the bottom of the shell 1, the sheet part 2 covers the water outlet 11, elastic legs are disposed on the sheet part 2 and include three support legs 3 and a first suspension leg 4, the sheet part 2 is supported at the bottom of the shell 1 through the three support legs 3, and the first suspension leg 4 is spaced apart from the bottom of the shell 1.

Wherein, the number of the support legs 3 may be two, three or more.

Wherein, the number of the first suspension legs 4 may be two, three or more.

Wherein, the distance between the first suspension leg 4 and the bottom of the shell 1 is smaller than or equal to an ultimate deformation distance of the three support legs 3, and the ultimate deformation distance of the three support legs 3 refers to a descending distance of the sheet part 2 when the three support legs 3 fracture under a water pressure. The distance between the first suspension leg 4 and the bottom of the shell 1 is associated with the ultimate deformation distance of different numbers of the support legs 3, and when the number of the support legs 3 is two, three or more as actually required, the ultimate deformation distance of the support legs 3 will change, and the distance between the first suspension support leg 4 and the bottom of the shell 1 will change with the ultimate deformation distance of the support legs 3.

A partition rib for partitioning the water outlet is disposed on the water outlet 11, and a pillar 6 is disposed on the partition rib and is located at the center of the water outlet 11, and the distance between the pillar 6 and the sheet part 2 is greater than the distance between the first suspension support leg 4 and the bottom of the shell 1.

Wherein, two, three or more pillars 6 may be disposed on the partition rib, and the multiple pillars 6 are symmetrical with respect to the water outlet 11.

The top of the shell 1 is fixedly connected to a top cover 7, a water hole 12 is formed in the top cover 7, limiting ribs 8 for partitioning the water hole are disposed at the water hole 12, limiting pillars 9 are disposed on the limiting ribs 8 and extend horizontally, and gaps are reserved between the limiting pillars 9 and the sheet part 2.

Two extension parts 5 for enlarging the area of the sheet part 2 are disposed on the sheet part 2.

The sheet part 2, the two extension parts 5, the three support legs 3 and the first suspension leg 4 are of an integrated structure, and the extension parts 5, the three support legs 3 and the first suspension leg 4 are located on the edge of the sheet body 2 and are spaced apart from one another.

The two extension parts 5 and the first suspension leg 4 are respectively located between the three support legs 3 on the sheet part 2.

A bubbler comprises the flow controller. Other components in the bubbler belong to the prior art, and only an existing flow control component is replaced with the flow controller in this embodiment.

Figure 4:
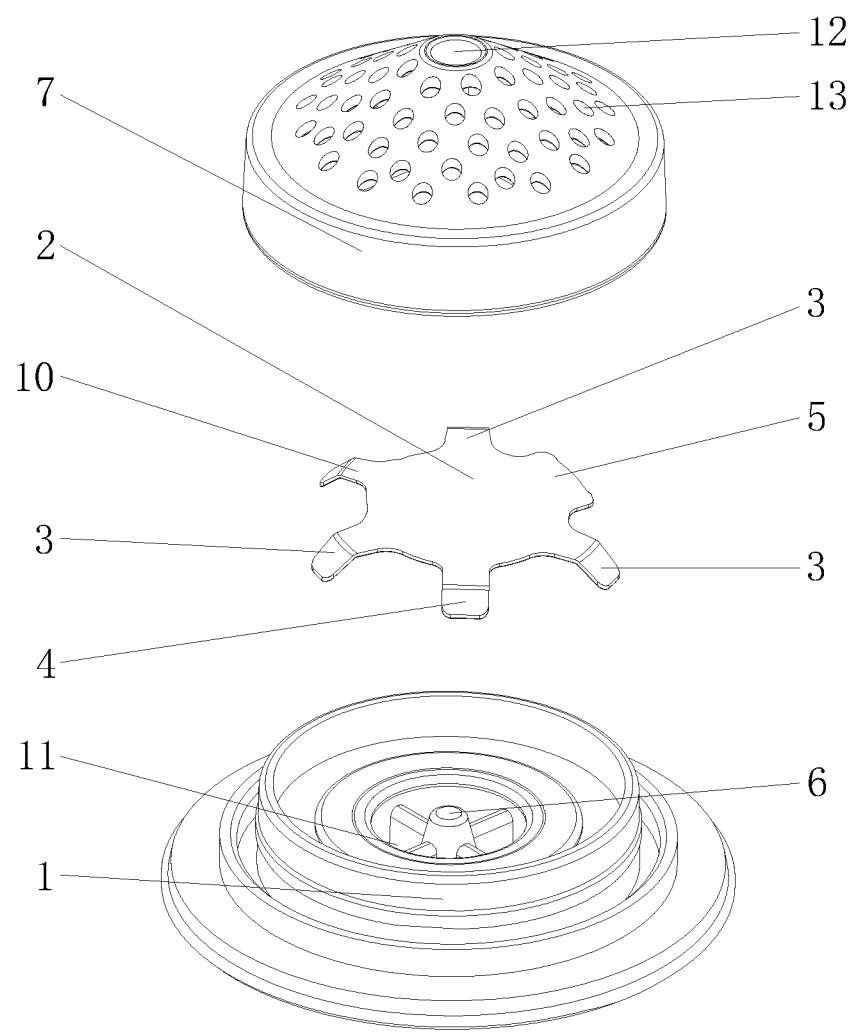
FIG. 4 is an exploded view of the overall structure of a flow controller in Embodiment 2 of the invention.
Figure 5:
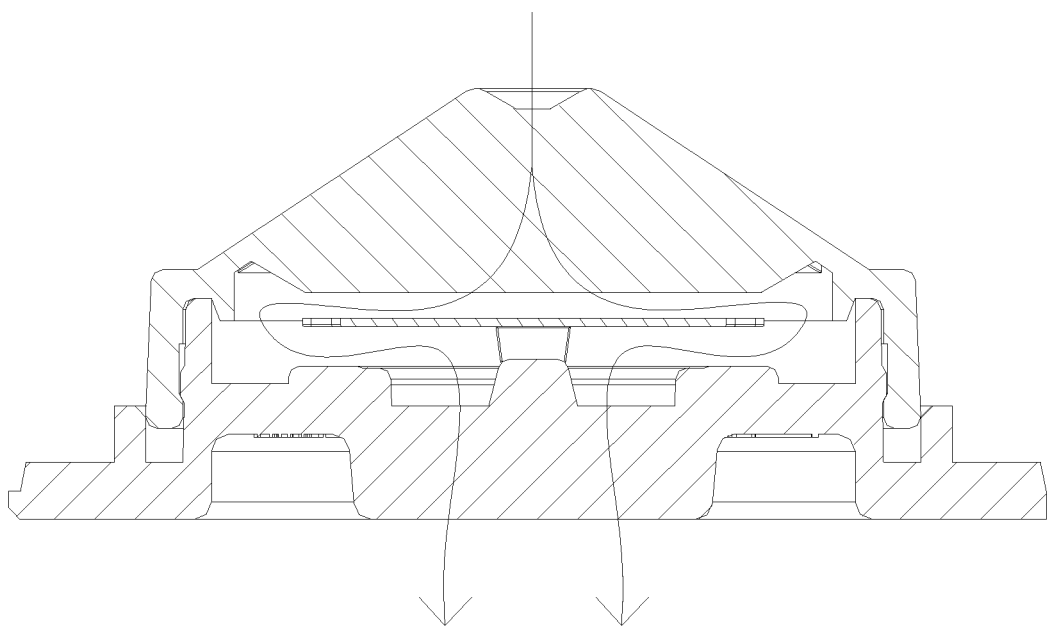
FIG. 5 is a vertical sectional view of FIG. 3 after assembly.

Referring to FIG. 4 and FIG. 5, Embodiment 2 of the invention is as follows:

Referring to Embodiment 1, Embodiment 2 differs from Embodiment 1 in the following aspects:

Five legs and an extension part 5 are disposed on the sheet part 2, wherein the five legs include three support legs 3, a first suspension leg 4 and a second suspension leg 10, wherein the distance between the first suspension leg 4 and the bottom of the shell 1 is smaller than the distance between the second suspension leg 10 and the bottom of the shell 1.

Wherein, the number of the first suspension legs 4 and the number of the second suspension legs 10 may be three, four or more, and the distances between the first suspension legs 4 and the bottom of the shell 1 as well as between the second suspension legs 10 and the bottom of the shell 1 are different. A third suspension leg and a fourth suspension leg may be arranged as specifically needed, and the distance between the first suspension leg 4 and the bottom of the shell 1, between the second suspension leg 10 and the bottom of the shell 1, between the third suspension leg and the bottom of the shell 1 as well as between the fourth suspension leg and the bottom of the shell 1 are different. In this way, multiple stages of support parts are formed to realize multi-stage support.

Wherein, the distance between the first suspension leg 4 and the bottom of the shell 1 is smaller than or equal to an ultimate deformation distance of the three support legs 3, and the distance between the second suspension leg 10 and the first suspension leg 4 is smaller than or equal to an ultimate deformation distance of the first suspension leg 4. Similarly, under the condition where the third suspension leg and the fourth suspension leg are arranged, the distance between the third suspension leg and the second suspension leg 10 is smaller than or equal to an ultimate deformation distance of the second suspension leg 10, and the distance between the fourth suspension leg and the third suspension leg is smaller than or equal to an ultimate deformation distance of the third suspension leg.

The extension part 5, the first suspension leg 4 and the second suspension leg 10 are respectively located between the three support legs 3 on the sheet part 2.

The distance between the pillar 6 and the sheet part 2 is greater than the distance between the first suspension leg 4 and the bottom of the shell 1.

More specifically, the distance between the pillar 6 and the sheet part 2 is greater than the distances between the suspension legs and the bottom of the shell 1.

The top cover 7 is conical, the water hole 12 is formed in the top of the top cover 7, and circular auxiliary water holes 13 are formed in the conical surface of the top cover and are smaller than the water hole 12 in size.

A bubbler comprises the flow controller. Other components in the bubblers belong to the prior art, and only an existing flow control component is replaced with the flow controller in this embodiment.

The flow direction of water in the flow controller in this embodiment is by the arrow in FIG. 5. Water enters the flow controller via the water hole in the top cover, impacts the sheet part to flow to the water outlet in the bottom along the space between the sheet part and the shell; with the increase of the inlet flow, the water pressure borne by the sheet part becomes larger gradually, the support legs deform elastically, the sheet part descends, the distance between the sheet part and the bottom of the shell becomes smaller, and the first suspension leg contacts with the bottom of the shell along with the descending of the sheet part to share the pressure borne by the support leg, so that the support legs are prevented from fracturing under pressure. When the water pressure further increases, the second suspension leg contacts with the bottom of the shell to share the pressure borne by the leg supported at the bottom of the shell, so that the leg supported at the bottom of the shell is prevented from fracturing under pressure; if the sheet part still descends after all the suspension legs contact with the bottom of the shell, the pillar will serve as the last stage of support part to support the sheet part, so that the water hole will not be directly covered by the sheet part. The suspension leg at each height is used as one stage of support part, and the different stages of support parts gradually contact with the bottom of the shell to support the sheet part along with the descending of the sheet part.

To sum up, the flow controller provided by the invention is provided with the support legs, the suspension leg and the pillar which are used to support the sheet part stage by stage, and when the water pressure borne by the sheet part increases gradually, all the stages of support parts participate in supporting one by one to prevent the legs from being fractured under pressure, stable operation of the sheet part is guaranteed, and the flow in the flow controller is kept stable.

The aforesaid description is merely for explaining the embodiments of the invention, and is not intended to limit the patent scope of the invention. All equivalent transformations made based on the contents of the specification and the drawings, or direct or indirect applications to relating technical fields should also fall within the patent protection scope of the invention.

What is claimed is:

1. A flow controller, comprising a shell and a sheet part, a water outlet being formed in a bottom of the shell, a top of the shell being open, the sheet part being located in the shell, a water space being formed between the sheet part and the bottom of the shell, the sheet part covering the water outlet, wherein elastic legs are disposed on the sheet part and include at least two support legs and at least one suspension leg, the sheet part is supported at the bottom of the shell through the support legs, and the suspension leg is spaced apart from the bottom of the shell;

wherein at least one extension part is disposed on the sheet part.

2. The flow controller according to claim 1, wherein at least one pillar is disposed between the bottom of the shell and the sheet part and is located at the bottom of the shell, and a distance between the sheet part and the pillar is greater than a distance between the suspension leg and the bottom of the shell.

3. The flow controller according to claim 2, wherein a partition rib for partitioning the water outlet is disposed at the water outlet, and the pillar is disposed on the partition rib.

4. The flow controller according to claim 1, wherein the number of the suspension legs is at least two, and distances between the at least two suspension legs and the bottom of the shell are different.

5. The flow controller according to claim 1, further comprising a top cover, wherein a water hole is formed in the top cover, and the top cover is connected to the top of the shell.

6. The flow controller according to claim 5, wherein a limiting rib for partitioning the water hole is disposed at the water hole in the top cover, a limiting pillar is disposed on the limiting rib and is located between the sheet part and the top cover, and a gap is reserved between the limiting pillar and the sheet part.

7. The flow controller according to claim 5, wherein the top cover is conical, the water hole is formed in the top of the top cover, and at least one auxiliary water hole is formed in a conical surface of the conical top cover and is smaller than the water hole in size.

8. A bubbler, comprising the flow controller according to claim 1.

9. A bubbler, comprising the flow controller according to claim 2.

10. A bubbler, comprising the flow controller according to claim 3.

11. A bubbler, comprising the flow controller according to claim 4.

12. A bubbler, comprising the flow controller according to claim 5.

\* \* \* \* \*